US010609912B2

(12) United States Patent
Snopkowski

(10) Patent No.: US 10,609,912 B2
(45) Date of Patent: Apr. 7, 2020

(54) METHOD AND DEVICE TO PREVENT TANGLING OF A FISHING LINE

(71) Applicant: Zachary Paul Snopkowski, Southbury, CT (US)

(72) Inventor: Zachary Paul Snopkowski, Southbury, CT (US)

(*) Notice: Subject to any disclaimer, the term of this patent is extended or adjusted under 35 U.S.C. 154(b) by 346 days.

(21) Appl. No.: 15/383,617

(22) Filed: Dec. 19, 2016

(65) Prior Publication Data
US 2018/0027789 A1 Feb. 1, 2018

Related U.S. Application Data

(60) Provisional application No. 62/368,519, filed on Jul. 29, 2016.

(51) Int. Cl.
*A01K 87/04* (2006.01)
*A01K 97/00* (2006.01)
*A01K 91/04* (2006.01)
*A01K 99/00* (2006.01)
*A01K 91/02* (2006.01)
*B65H 59/00* (2006.01)
*A01K 87/00* (2006.01)

(52) U.S. Cl.
CPC .......... *A01K 87/04* (2013.01); *A01K 87/007* (2013.01); *A01K 91/02* (2013.01); *A01K 91/04* (2013.01); *A01K 97/00* (2013.01); *A01K 99/00* (2013.01); *B65H 59/00* (2013.01)

(58) Field of Classification Search
CPC ...... A01K 87/007; A01K 97/00; A01K 87/04; A01K 97/12; A01K 97/125; A01K 91/08

USPC ............ 43/25, 4, 24, 17, 43.13, 43.12
See application file for complete search history.

(56) References Cited

U.S. PATENT DOCUMENTS

| 664,889 | A | * | 1/1901 | Ogimura | A01K 87/00 43/25 |
| 1,251,221 | A | * | 12/1917 | Greenwald | A01K 87/00 43/25 |
| 1,709,436 | A | * | 4/1929 | Koester | A01K 97/16 43/25 |

(Continued)

FOREIGN PATENT DOCUMENTS

| EP | 2056671 B1 | * | 5/2012 | A01K 91/02 |
| FR | 1275051 A | * | 11/1961 | A01K 87/04 |

(Continued)

Primary Examiner — Darren W Ark
(74) Attorney, Agent, or Firm — DeLio Peterson & Curcio LLC; Thomas E. Ciesco

(57) ABSTRACT

A fishing accessory for preventing the tangling of a fishing line on a fishing pole comprising a base attachable to the fishing pole and an adjustable guide member. The adjustable guide member is movable from a first position wherein a portion of the guide member contacts a guide surface of the base to a position wherein the portion of the guide member is positioned distant from the guide surface. The fishing accessory includes an adjustment member extending from the guide member engaged with an opening in the base wherein moving the adjustment member in one direction moves the guide member away from the guide surface and moving the adjustment member in the opposite direction moves the guide member closer to the guide surface. The position of the guide member is adjustable toward and away from the guide surface to accommodate a specific diameter fishing line.

3 Claims, 16 Drawing Sheets

(56) References Cited

U.S. PATENT DOCUMENTS

| | | | | |
|---|---|---|---|---|
| 2,549,694 A * | 4/1951 | Leyda | A01K 97/125 | 43/17 |
| 2,713,228 A * | 7/1955 | Grunwald | A01K 91/06 | 15/256.6 |
| 2,791,858 A * | 5/1957 | Kernodle | A01K 87/00 | 43/25 |
| 2,804,711 A * | 9/1957 | Kozar | A01K 91/02 | 24/507 |
| 2,978,828 A * | 4/1961 | Taylor | A01K 97/125 | 43/17 |
| 3,045,380 A * | 7/1962 | Meredith | A01K 87/00 | 43/25 |
| 3,050,898 A * | 8/1962 | Bernd | A01K 91/02 | 43/25 |
| 3,057,106 A * | 10/1962 | Wheeler | A01K 91/02 | 24/486 |
| 3,156,998 A * | 11/1964 | McDaniel | A01K 89/01914 | 242/276 |
| 3,256,633 A * | 6/1966 | Smith | A01K 87/00 | 43/25 |
| 3,309,810 A * | 3/1967 | Hannon | A01K 87/04 | 43/24 |
| 3,545,119 A * | 12/1970 | Murnan | A01K 87/04 | 43/25 |
| 3,581,428 A * | 6/1971 | Helder | A01K 87/00 | 24/326 |
| 3,654,722 A * | 4/1972 | Camilleri | A01K 91/02 | 43/25 |
| 3,756,638 A | 9/1973 | Stockberger | | |
| 3,766,681 A * | 10/1973 | Mander | A01K 91/08 | 43/43.12 |
| 3,769,737 A * | 11/1973 | Miyamae | A01K 87/00 | 242/273 |
| 3,782,023 A * | 1/1974 | Hendrickson | A01K 91/02 | 43/25 |
| 3,798,630 A * | 3/1974 | Crosthwait | A01K 97/125 | 43/17 |
| 3,855,720 A * | 12/1974 | Dorph | A01K 87/00 | 43/25 |
| 3,927,488 A * | 12/1975 | Peddy | A01K 87/00 | 43/25 |
| 4,003,153 A * | 1/1977 | Khalil | A01K 87/00 | 43/25 |
| 4,015,362 A * | 4/1977 | Johnson | A01K 91/06 | 43/21.2 |
| 4,051,617 A * | 10/1977 | Dorph | A01K 87/00 | 43/18.1 R |
| 4,156,983 A * | 6/1979 | Moore | A01K 87/00 | 43/25 |
| 4,209,930 A * | 7/1980 | Boynton | A01K 97/01 | 43/17 |
| 4,246,716 A * | 1/1981 | Elmer | A01K 97/01 | 43/17 |
| 4,507,890 A * | 4/1985 | Thorne | A01K 97/125 | 43/17 |
| 4,519,158 A * | 5/1985 | Kirk | A01K 97/125 | 43/17 |
| 5,129,174 A * | 7/1992 | Wilson | A01K 97/12 | 43/17 |
| 5,138,788 A * | 8/1992 | Buenzli | A01K 87/00 | 43/25 |
| 5,218,776 A * | 6/1993 | Wolf, Jr. | A01K 89/003 | 43/25 |
| 5,396,726 A * | 3/1995 | Zepeda, Sr. | A01K 97/125 | 43/17 |
| 5,511,337 A * | 4/1996 | Nilsson | A01K 87/00 | 43/25 |
| 5,548,918 A * | 8/1996 | Varrichione | A01K 87/00 | 43/25 |
| 5,822,910 A * | 10/1998 | Shewmake | A01K 91/06 | 43/25 |
| 5,979,104 A * | 11/1999 | Walker | A01K 91/08 | 43/43.12 |
| 6,119,389 A * | 9/2000 | Walker | A01K 97/125 | 43/17 |
| 6,192,619 B1 * | 2/2001 | Pirkle | A01K 91/08 | 43/43.12 |
| 6,195,928 B1 * | 3/2001 | Nachtsheim | A01K 97/125 | 43/17 |
| 6,802,151 B1 * | 10/2004 | Jochum | A01K 91/06 | 43/24 |
| 7,793,459 B1 * | 9/2010 | Ruzicka | A01K 91/04 | 43/42.49 |
| 8,756,854 B1 * | 6/2014 | Michaels | A01K 97/10 | 43/17 |
| 9,277,738 B2 * | 3/2016 | Tschantz | A01K 87/007 | |
| 9,480,244 B2 * | 11/2016 | Cooper | A01K 87/06 | |
| 9,532,556 B2 * | 1/2017 | Farrington | A01K 89/0155 | |
| 9,642,346 B2 * | 5/2017 | Hannon | A01K 87/005 | |
| 2005/0229472 A1 * | 10/2005 | Jost | A01K 97/06 | 43/25.2 |
| 2006/0218843 A1 * | 10/2006 | Sanchez | A01K 97/125 | 43/17 |
| 2007/0271835 A1 * | 11/2007 | Wicinski | A01K 97/125 | 43/17 |
| 2008/0066366 A1 * | 3/2008 | Todd | A01K 97/125 | 43/17 |
| 2009/0241407 A1 * | 10/2009 | Eisbrenner | A01K 87/007 | 43/25 |
| 2016/0057985 A1 | 3/2016 | Farrington | | |

FOREIGN PATENT DOCUMENTS

| | | | | |
|---|---|---|---|---|
| FR | 2921230 A1 * | 3/2009 | | A01K 91/06 |
| GB | 2505699 A * | 3/2014 | | |
| JP | 7050928 Y2 | 11/1995 | | |
| JP | 3443098 B2 * | 9/2003 | | |
| JP | 2006101864 A * | 4/2006 | | |
| SU | 583789 A1 * | 12/1977 | | |
| WO | WO-2007055328 A1 * | 5/2007 | | A01K 87/007 |
| WO | WO-2008019435 A1 * | 2/2008 | | A01K 91/02 |
| WO | WO-2009150476 A1 * | 12/2009 | | A01K 87/04 |

* cited by examiner

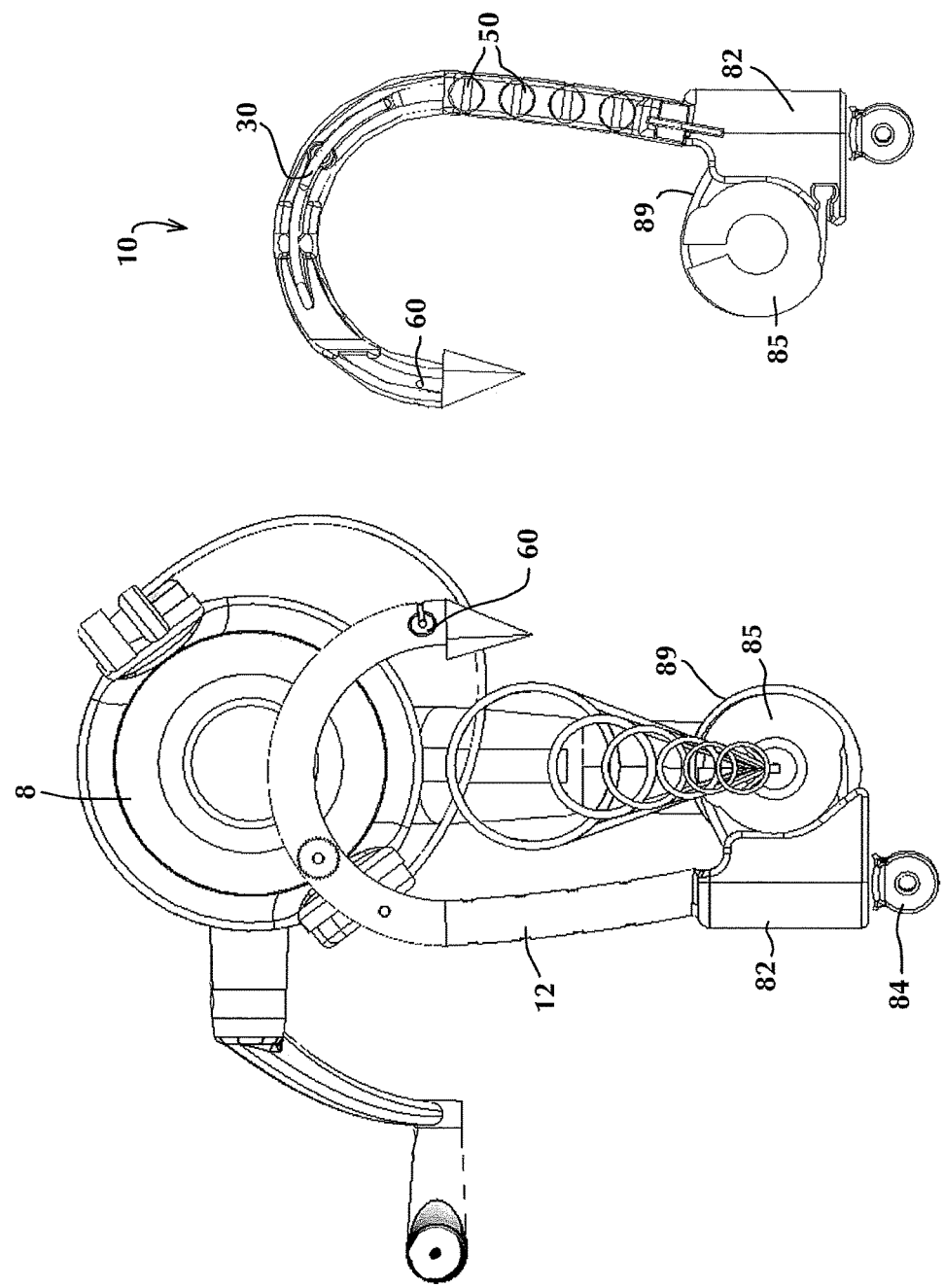

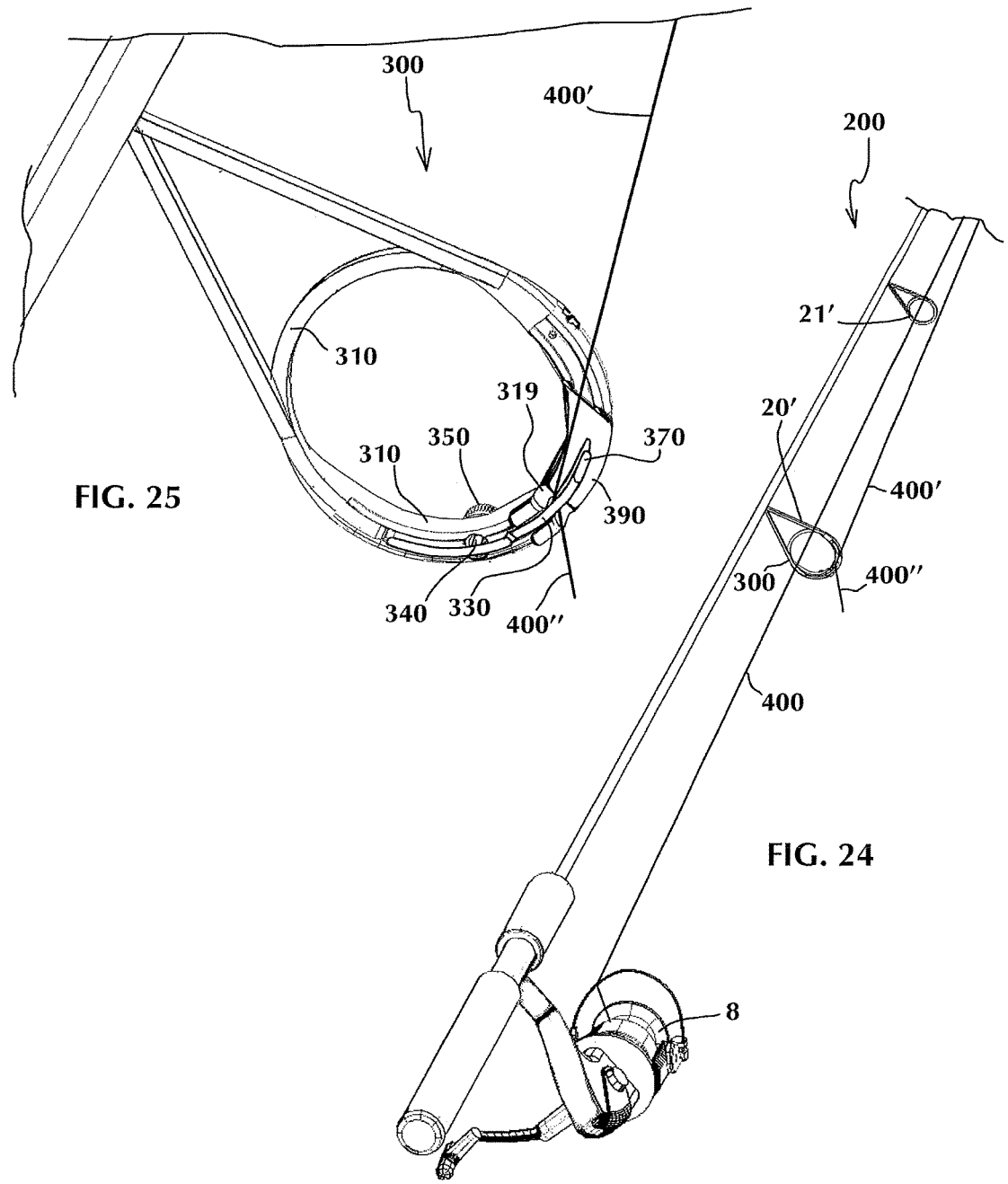

METHOD AND DEVICE TO PREVENT TANGLING OF A FISHING LINE

BACKGROUND OF THE INVENTION

1. Field of the Invention

The present invention relates generally to a method and device that prevents tangling of a fishing line by applying tension to the line prior to it passing through the tip of the rod.

2. Description of Related Art

When a fishing line no longer has tension on it (i.e. if the hook or bait fell off after casting), tension must be applied to the line, usually with the fisherman's finger, in order to prevent tangling and knotting in the reel of the rod as the line is reeled in. The device of the present invention and its method of use allow quick and easy tension/release of the line, while being mounted to the rod and always being outside the natural movement of the fishing line as it passes through the casting guides on the pole.

SUMMARY OF THE INVENTION

Bearing in mind the problems and deficiencies of the prior art, it is therefore an object of the present invention to provide a fishing accessory that prevents tangling of a fishing line.

It is another object of the present invention to provide a fishing accessory which can secure a fishing line of various diameters.

A further object of the invention is to provide a fishing accessory which magnetically secures fishing hooks to the accessory.

It is yet another object of the present invention to provide a fishing accessory attachable to a fishing pole with a band clamp system.

It is still another object of the present invention to provide a fishing accessory which allows easy threading of a fishing line through the fishing hook eyelet.

It is another object of the present invention to provide a fishing accessory integrated with the fishing pole or integrated directly into a casting guide.

Still other objects and advantages of the invention will in part be obvious and will in part be apparent from the specification.

The above and other objects, which will be apparent to those skilled in the art, are achieved in the present invention which is directed to a fishing accessory for preventing the tangling of a fishing line on a fishing pole comprising, a base attachable to the fishing pole and extending therefrom. The fishing accessory includes an adjustable guide member movable from a first position wherein a portion of the guide member contacts a guide surface of the base to a position wherein the portion of the guide member is positioned distant from the guide surface. The fishing accessory includes an adjustment member extending from the guide member or the base, the adjustment member engaged with the base wherein moving the adjustment member in one direction moves the guide member away from the guide surface and moving the adjustment member in the opposite direction moves the guide member closer to the guide surface. The position of the guide member is adjustable toward and away from the guide surface to accommodate a specific diameter fishing line. The fishing line may be placed between a first end of the guide member and the guide surface and slid toward a central portion of the guide member until the fishing line is secured between the guide member and the guide surface to restrict longitudinal movement of the fishing line. The accessory base may have a primary axis and an outer surface and the guide surface may extend along a portion of the base in the general direction of the primary axis and the adjustable guide member may be an elongated rod having a length, a guide member second end opposite the first end and a rounded portion extending from the second end wherein the fishing line is placed between the guide member rounded portion and slide along the guide member until the fishing line is secured between the guide member and the guide surface to restrict longitudinal movement of the fishing line. The guide surface may be an inclined surface extending gradually in the direction of the primary axis and extending sharply inward from the accessory base outer surface toward the primary axis and a first portion of the guide member may contact the inclined surface at a location where the inclined surface intersects the primary surface to a position wherein the first portion of the guide member is positioned distant from the inclined surface, the guide member having a second end including a rounded portion extending from the first portion. The fishing accessory may include a channel perpendicular to the primary axis and adjacent the inclined surface where the inclined surface intersects the outer surface of the elongated accessory base, the fishing line securable in the channel when the fishing line is slid along the guide member until the fishing line contacts the channel. The guide member may include a flexible elongated portion which bends when the fishing line is slid along the guide member, the guide member providing a force which holds the fishing line against the guide surface. The fishing accessory may include a groove in the accessory base guide surface extending in the direction of the guide member, the groove engagable with the elongated guide member wherein the member is engaged with the groove when the guide member is in the first position. The adjustment member may be a threaded cylindrical rod slidingly disposed in a cylindrical opening extending through the accessory base, the cylindrical opening having a first and second end, the fishing accessory including a threaded nut engagable with a distal end of threaded adjustment member, the distal end protruding from the first end of the cylindrical opening, wherein turning the nut in one direction moves the guide member closer to the guide surface and turning the nut in the opposite direction moves the guide member away from the guide surface. The fishing accessory may include a compression spring disposed around the adjustment member and adjacent a cylindrical opening second end, the compressing spring urging the guide member away from the contact surface. The fishing accessory base may be arcuate along the contact surface and the guide member is arcuate in a plane parallel with the contact surface. The fishing accessory may include a guide pin parallel with the adjustment member and extending from the guide member, the guide pin slidingly engaged with a guide opening in the accessory base wherein moving the adjustment member in either direction moves the guide pin in the same direction. The fishing accessory base may be integrated into the fishing pole. The fishing pole may include a plurality of casting guides wherein the adjustable guide member may be integrated into at least one of the casting guides. The fishing accessory may include a hook threader for a fishing accessory. The hook threader comprises a circular opening extending through a fishing accessory elongated member, the circular opening having a central axis and a rectangular slot extending perpendicular to the circular opening. The rectangular slot has a height extending in the direction of the circular opening central axis, a width extending the length of the fishing accessory and a depth extending from an outer surface of the fishing accessory toward the circular opening. The rectangular slot extends from the outer surface of the fishing accessory to the circular opening. The hook threader includes a funneled opening juxtaposed with the circular opening, the funnel opening wider at the fishing accessory outer surface and tapering down to the diameter of the circular opening adjacent the rectangular slot. The hook threader includes a channel disposed in a second surface of the rectangular slot opposite the rectangular slot surface adjacent the funneled opening, the channel extending from the fishing accessory surface to the circular opening. A fishing hook eyelet disposed on a fishing hook is insertable into the rectangular slot and a fishing line is insertable into the funneled opening, the fishing line passing through the eyelet of the hook. The fishing accessory may include a hook holder for a fishing accessory comprising at least one opening extending through a fishing accessory elongated member, the opening having a central axis and a magnet disposed sufficiently close to the opening for the magnetic field to hold a fishing hook engaged in the at least one opening. The fishing accessory may include a fishing line cutter comprising an opening in the fishing accessory base, a blade disposed in the opening, the blade having a sharp edge extending adjacent a surface of the fishing accessory elongated member.

Another aspect of the invention is directed to a method for using the fishing accessory. The method includes providing a fishing pole having a rod and a reel and the fishing accessory, ensuring the fishing accessory is fastened to the fishing pole and positioning the adjustment member for a specific diameter fishing line. The method includes placing the fishing line adjacent the first end of the guide member and sliding the fishing line along the guide member until the fishing line is secured between the contact surface and the guide member.

Another aspect of the present invention is directed to a tensioning casting guide for attachment to a fishing pole comprising a ring having a guide surface disposed on a portion thereof and an adjustable guide member movable from a first position wherein a portion of the guide member contacts the guide surface of the casting guide to a position wherein the portion of the guide member is positioned distant from the guide surface. The casting guide includes an adjustment member extending from the guide member, the adjustment member engaged with the casting guide wherein moving the adjustment member in one direction moves the guide member away from the guide surface and moving the adjustment member in the opposite direction moves the guide member closer to the guide surface. The position of the guide member is adjustable toward and away from the guide surface to accommodate a specific diameter fishing line. The fishing line may be placed between a first end of the guide member and the guide surface and slid toward a central portion of the guide member until the fishing line is secured between the guide member and the guide surface to restrict longitudinal movement of the fishing line, preventing the tangling of the fishing line on a fishing pole. The casting guide may include a compression spring disposed around the adjustment member and an adjustment fastener engagable with the adjustment member, the compressing spring urging the guide member away from the guide surface, whereby moving the adjustment fastener in one direction moves the guide member away from the guide surface and moving the adjustment fastener in the opposite direction moves the guide member toward the guide surface. The adjustment member may be a threaded cylindrical rod slidingly disposed in a cylindrical opening extending through the casting guide ring, the cylindrical opening having a first and second end, the casting guide including a threaded nut engagable with a distal end of threaded adjustment member, the distal end protruding from the first end of the cylindrical opening, wherein turning the nut in one direction moves the guide member closer to the guide surface and turning the nut in the opposite direction moves the guide member away from the guide surface. The casting guide may include a guide pin parallel with the adjustment member and extending from the guide member, the guide pin slidingly engaged with a guide opening in the casting guide ring wherein moving the adjustment member in either direction moves the guide pin in the same direction. The casting guide may be integrated into the fishing pole or may be attachable to the fishing pole. Another aspect of the casting guide is directed to a method for using the casting guide for preventing the tangling of a fishing line. The method includes providing a fishing pole including a reel disposed near one end of the fishing pole, an end casting guide disposed on the opposite end of the fishing pole and the tensioning casting guide. The method includes positioning the adjustment member for a specific diameter fishing line, ensuring a fishing line extends from the reel to the end casting member and placing a portion of the fishing line extending from the end casting guide adjacent the end of the guide member. The method includes sliding the fishing line along the guide member until the fishing line is secured between the guide surface and the guide member, leaving a free end of the fishing line extending from the guide surface and pulling on the free end of the fishing line until a tension is placed on the fishing line.

Another aspect of the present invention is directed to a wireform for a fishing accessory for preventing the tangling of a fishing line. The wireform comprises an elongated base member having base member ends and disposable within a groove in the fishing accessory, the fishing accessory having a guide opening extending perpendicular from one end of the groove and an adjustment opening extending in the same direction as the guide opening extending from a central location of the groove. The wireform includes a guide post extending perpendicular from one end of the elongated base member slidingly disposable in the fishing accessory guide opening and a threaded post having external threads, the threaded post extending parallel with the guide post from an inner portion of the elongated base member, the threaded post slidingly disposable in the fishing accessory adjustment opening. The wireform includes an adjustment nut having a ridged perimeter and internal threads engagable with the external threads of the wireform threaded post and a spring disposable about the threaded portion of the threaded post, the spring on the same side of the fishing accessory as the wireform is inserted. The wireform includes a guide member having ends and a length between the ends, the guide member extending from the elongated base end opposite the guide post and a loop extending from the guide member opposite the end of the guide member attached to the elongated base member, the fishing accessory including an inclined ramp alignable with the guide member, the incline extending in the direction of the guide member length and a transverse depression disposed across the groove near the shallow portion of the inclined ramp. A fishing line may be placed between the guide member and the guide surface adjacent the guide member loop and slid toward a central portion of the guide member until the fishing line is secured in the depression to restrict longitudinal movement of the fishing line.

Another aspect of the present invention is directed to a fishing accessory for preventing the tangling of a fishing line comprising an accessory base having an arcuate portion, a straight portion extending from the arcuate portion, the arcuate portion having a first and second opening. The fishing accessory includes a fastening portion extending from a distal end of the straight portion, the fastening portion including a fastener body having a body opening extending therethrough, a threaded thumbscrew extending through the body opening and engagable with a slotted band extending around a clamp body, the clamp body positionable about a fishing pole rod wherein turning the thumbscrew in one direction tightens the clamp body against the fishing pole rod and turning the thumbscrew in the opposite direction loosens the clamp body from the fishing pole rod. The fishing accessory includes a plurality of hook openings in the straight portion of the fishing accessory and a plurality of magnets, each magnet positioned adjacent one of the hook openings and a wireform having an arcuate rod alignable with a groove disposed in the arcuate portion of the accessory, a first finger extending perpendicular from one end of the arcuate rod and a second finger having external threads and extending parallel with the first finger from a central location on the arcuate rod and a loop extending from an opposite end of the arcuate rod opposite the one end of the arcuate rod. The fishing accessory includes a circular nut having a ridged perimeter and internal threads engagable with the external threads of the wireform second finger. The first finger is positionable in the first opening of the arcuate portion and the second finger is positionable in the second opening of the arcuate portion and the circular nut engages the external threads of the second finger from the opposite side of the arcuate portion from which the second finger is inserted.

Another aspect of the present invention is directed to a method for using a fishing accessory for preventing the tangling of a fishing line comprising providing a fishing pole having a rod and a reel. The method includes providing a fishing accessory comprising an accessory base having an arcuate portion, a straight portion extending from the arcuate portion, the arcuate portion having a first and second opening and a fastening portion extending from a distal end of the straight portion, the fastening portion including a fastener body having a body opening extending therethrough, a threaded thumbscrew extending through the body opening and engagable with a slotted band extending around a clamp body, the clamp body positionable about a fishing pole rod wherein turning the thumbscrew in one direction tightens the clamp body against the fishing pole rod and turning the thumbscrew in the opposite direction loosens the clamp body from the fishing pole rod. The fishing accessory includes a plurality of hook openings in the straight portion of the fishing accessory and a plurality of magnets, each magnet positioned adjacent one of the hook openings and a wireform having an arcuate rod alignable with a groove disposed in the arcuate portion of the accessory, a first finger extending perpendicular from one end of the arcuate rod and a second finger having external threads and extending parallel with the first finger from a central location on the arcuate rod and a loop extending from an opposite end of the arcuate rod opposite the one end of the arcuate rod. The fishing accessory includes a circular nut having a ridged perimeter and internal threads engagable with the external threads of the wireform second finger wherein the first finger is positionable in the first opening of the arcuate portion and the second finger is positionable in the second opening of the arcuate portion and the circular nut engages the external threads of the second finger from the opposite side of the arcuate portion from which the second finger is inserted. The method includes providing a fishing pole having a rod and a reel, ensuring the fishing accessory is fastened to the fishing pole and adjusting the circular nut to position the wireform to hold the fishing line. The method includes placing the fishing line adjacent the rounded portion of the guide member and sliding the fishing line along the guide member until the fishing line is secured between the contact surface and the guide member. The fishing accessory may include a hook threader for a fishing accessory comprising a circular opening extending through a fishing accessory elongated member, the circular opening having a central axis. The hook threader includes a rectangular slot extending perpendicular to the circular opening, the rectangular slot having a height extending in the direction of the circular opening central axis, a width extending the length of the fishing accessory and a depth extending from an outer surface of the fishing accessory toward the circular opening, the rectangular slot extending from the outer surface of the fishing accessory to the circular opening. The hook threader includes a funneled opening juxtaposed with the circular opening, the funnel opening wider at the fishing accessory outer surface and tapering down to the diameter of the circular opening adjacent the rectangular slot and a channel disposed in a second surface of the rectangular slot opposite the rectangular slot surface adjacent the funneled opening, the channel extending from the fishing accessory surface to the circular opening. A fishing hook eyelet disposed on a fishing hook is insertable into the rectangular slot and a fishing line is insertable into the funneled opening, the fishing line passing through the eyelet of the hook. The fishing accessory may include a hook holder for a fishing accessory comprising at least one opening extending through a fishing accessory elongated member, the opening having a central axis and a magnet disposed sufficiently close to the opening for the magnetic field to hold a fishing hook engaged in the at least one opening. The fishing accessory may include a fishing line cutter for a fishing accessory comprising an opening in a fishing accessory elongated member and a blade disposed in the opening, the blade having a sharp edge extending adjacent a surface of the fishing accessory elongated member.

The fishing line that extends from the top casting guide at the end of the fishing pole rod is pulled back toward the reel and engages guide member and base groove. The fishing accessory may be secured to the fishing pole at any position, and extends parallel to the casting guides. The preferred attachment location is 1 to 3 inches above the bottom casting guide. The device body may be hook shaped and may have a pointed end similar to a fishing hook, although the pointed end may not have a specific function. The wireform may include a threaded post, guide post and an eyelet at the opposite end of the wireform as the guide post. The wireform may be flexible and may be made of a spring material to allow the wireform to flex when the user is inserting or removing the fishing line. The wireform may include a main arc portion which includes the threaded post and the guide post. The wireform may also include an offset arc portion which includes the eyelet. The wireform may be disposed in an arc shaped channel of the device and may be adjustable from a position where the wireform is completely within the groove to a position wherein the wireform eyelet is disposed fully outside of the channel. The threaded post may engage an adjustment nut in the device body which the user may use to move the wireform toward and away from the channel for adjusting for the line diameter. The device may include a notch in the device body perpendicular to the arc of the channel. The fishing line may be slid against the offset portion of the wireform until the line engages the notch to maintain tension and hold the line. The device may be used to maintain tension on the fishing line in the process of spooling new line on a reel.

In operation, to secure the fishing line, the fishing line is passed between the eyelet and the ramp toward the notch until the fishing line is fully secured in the notch. To discharge the line from the device, the user pulls in the opposite direction until the fishing line flexes the wireform sufficient to move the wireform away from the notch, releasing the fishing line from the notch without damaging the fishing line.

The present invention is a fishing accessory for preventing the tangling of a fishing line comprising an accessory base having an arcuate portion, a straight portion extending from the arcuate portion, the arcuate portion having a first and second opening; a fastening portion extending from a distal end of the straight portion, the fastening portion including a fastener body having a body opening extending therethrough, a threaded thumbscrew or similar fastener extending through the body opening and engagable with a slotted band extending around a clamp body, the clamp body positionable about a fishing pole rod wherein turning the thumbscrew in one direction tightens the clamp body against the fishing pole rod and turning the thumbscrew in the opposite direction loosens the clamp body from the fishing pole rod; a plurality of hook openings in the straight portion of the fishing accessory and a plurality of magnets, each magnet positioned adjacent one of the hook openings; a wireform having an arcuate rod alignable with a groove disposed in the arcuate portion of the accessory, a first finger extending perpendicular from one end of the arcuate rod and a second finger having external threads and extending parallel with the first finger from a central location on the arcuate rod and a loop extending from an opposite end of the arcuate rod opposite the one end of the arcuate rod; a circular nut having a ridged perimeter and internal threads engagable with the external threads of the wireform second finger; wherein the first finger is positionable in the first opening of the arcuate portion and the second finger is positionable in the second opening of the arcuate portion and the circular nut engages the external threads of the second finger from the opposite side of the arcuate portion from which the second finger is inserted.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 is a top elevational view of the fishing accessory shown in FIG. 1, mounted on a fishing pole having a reel attached.

FIG. 4 is a bottom elevational view of the fishing accessory shown in FIG. 1.

FIG. 24 is a perspective view of the lower half of a fishing pole having a fishing accessory according to the present invention integrated with the fishing pole.

FIG. 25 is a perspective close-up of the fishing accessory shown in FIG. 24.

DESCRIPTION OF THE PREFERRED EMBODIMENT(S)

In describing the preferred embodiment of the present invention, reference will be made herein to FIGS. 1-27 of the drawings in which like numerals refer to like features of the invention.

Figure 1:
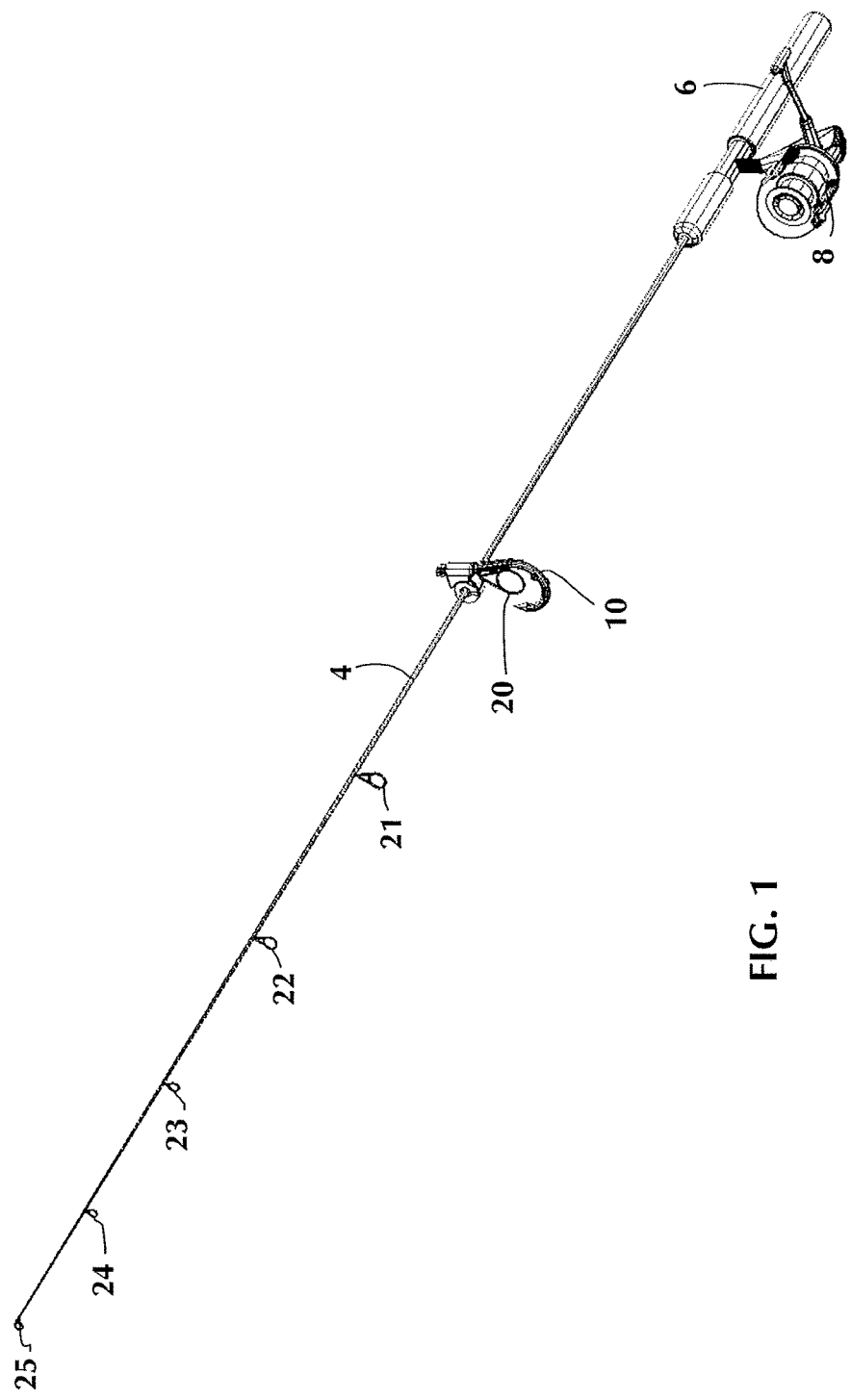
FIG. 1 is a perspective view of a fishing accessory fastened to a fishing rod according to the present invention.
Figure 2A:
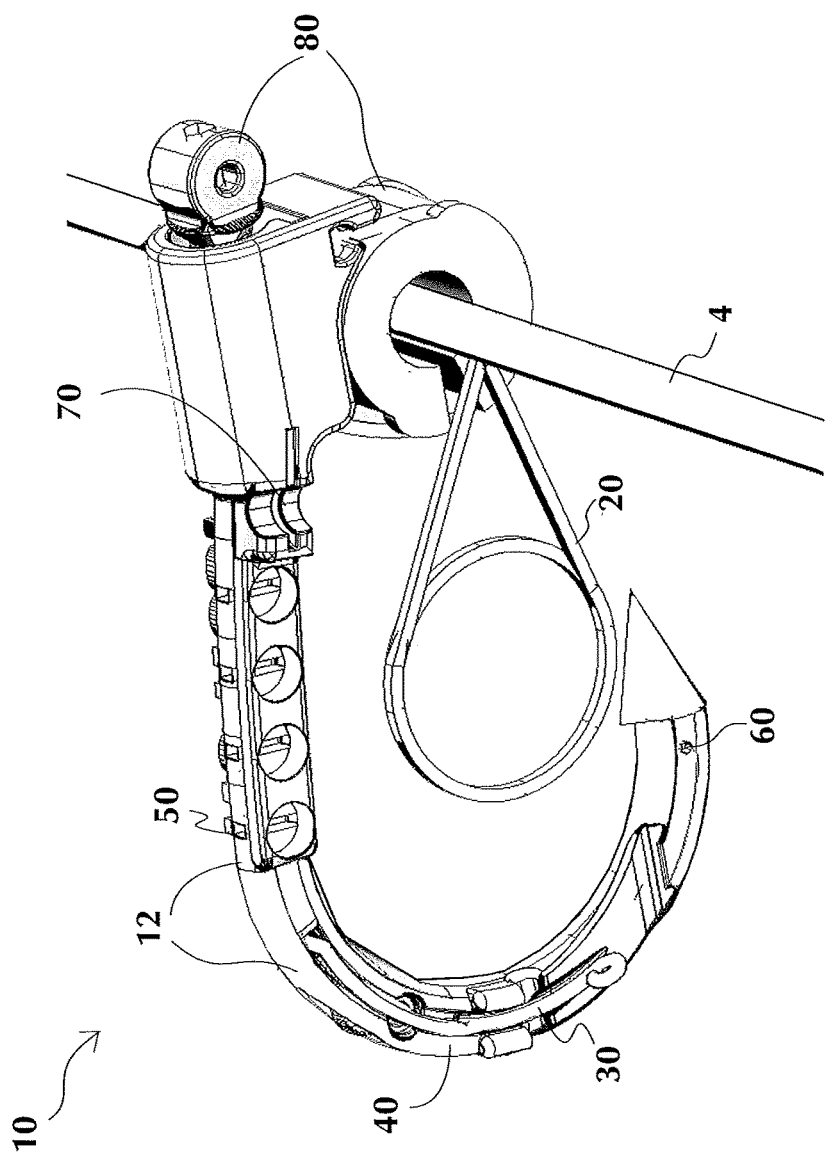
FIG. 2A is a bottom right rear perspective view of the fishing accessory according to the present invention.
Figure 2B:
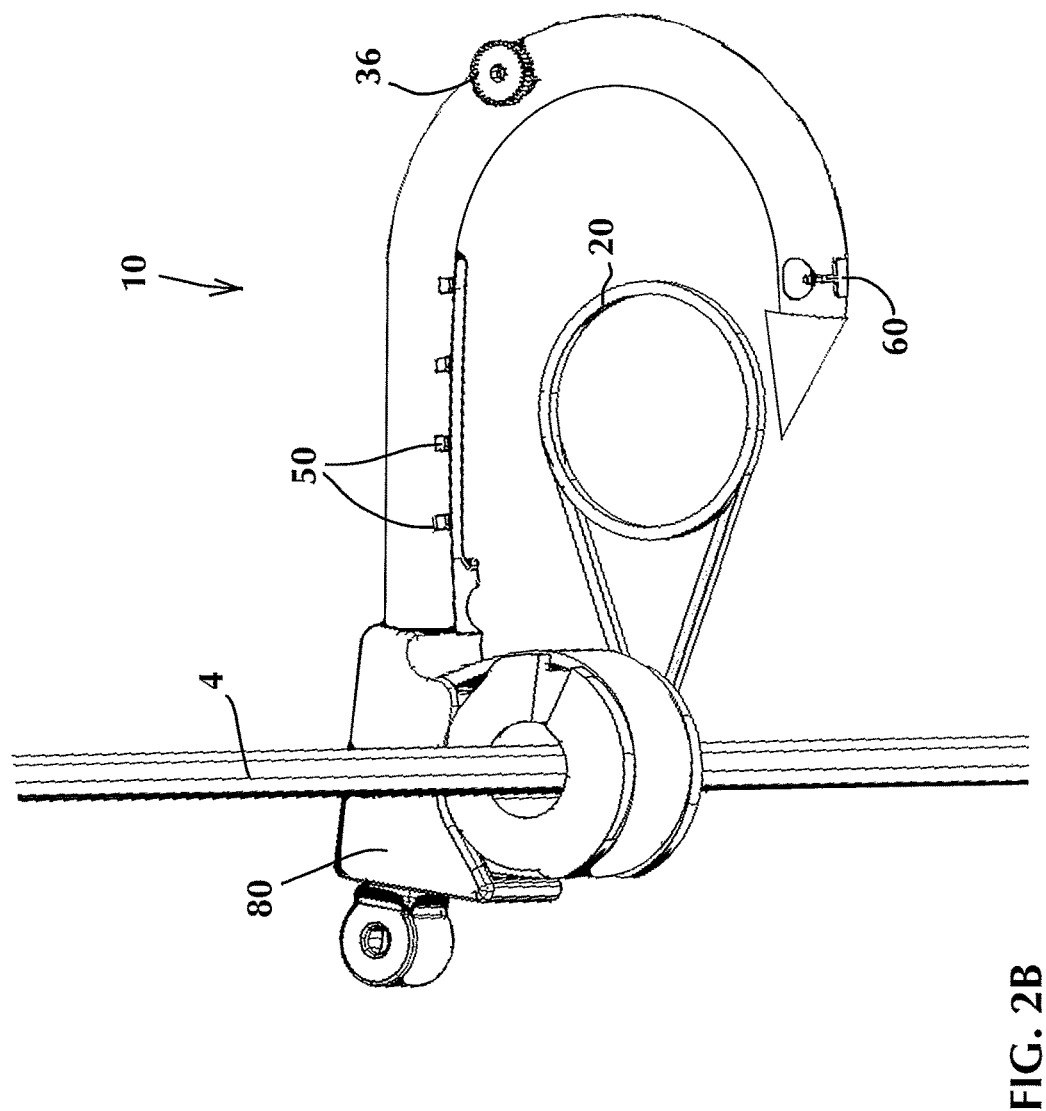
FIG. 2B is a top left perspective view of the fishing accessory shown in FIG. 1.
Figure 5:
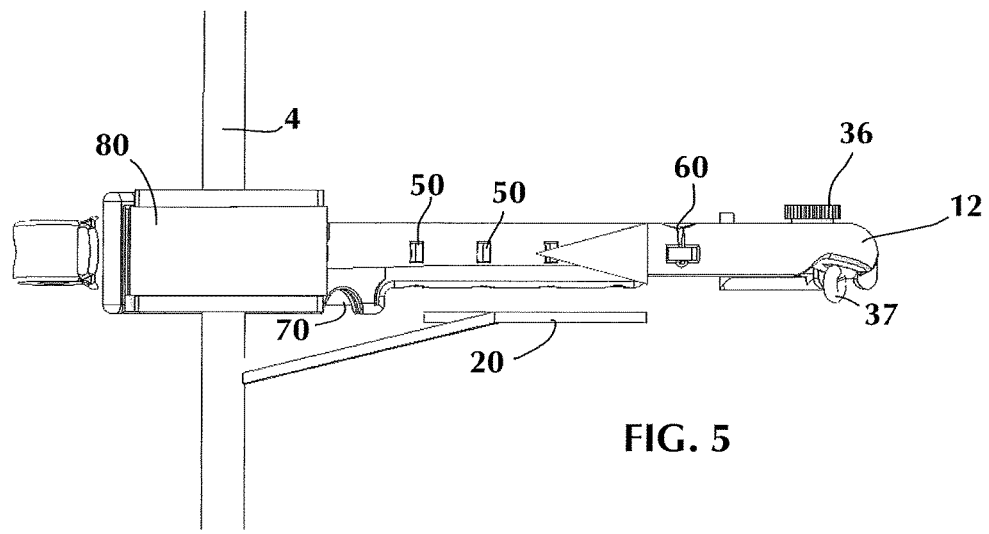
FIG. 5 is a left elevational view of the fishing accessory shown in FIG. 1.
Figure 6:
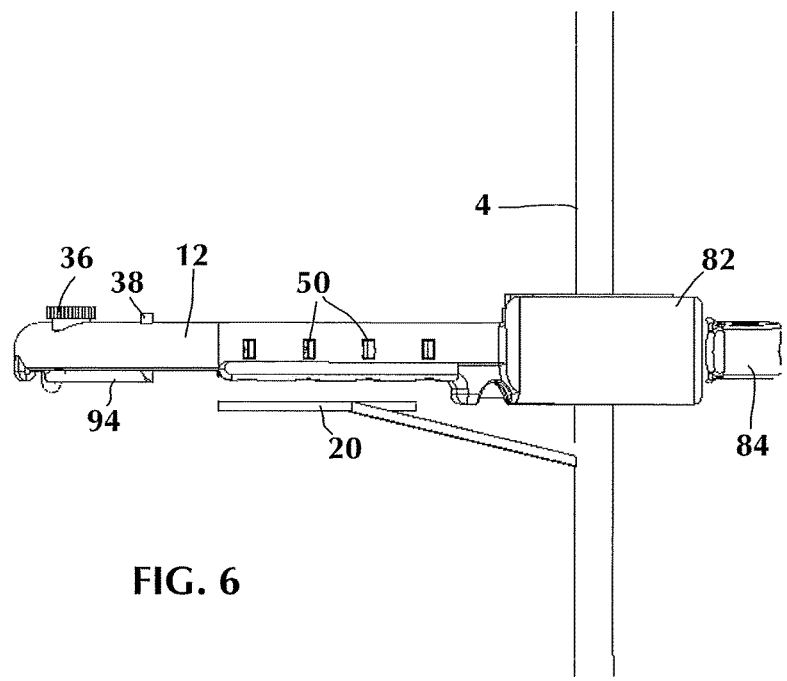
FIG. 6 is a right elevational view of the fishing accessory shown in FIG. 1.
Figure 7:
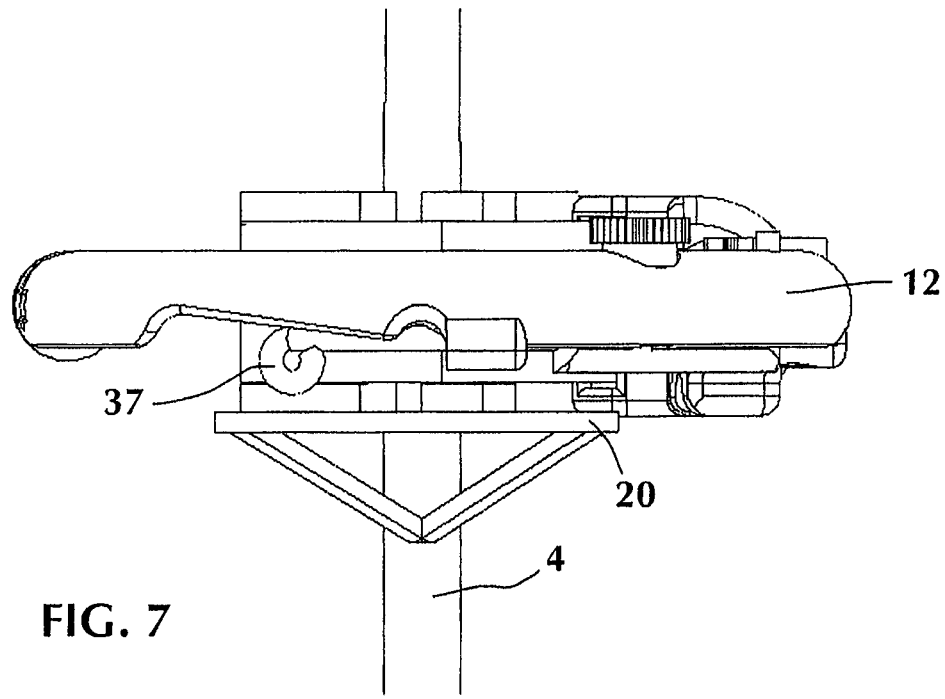
FIG. 7 is a rear elevational view of the fishing accessory shown in FIG. 1.
Figure 8:
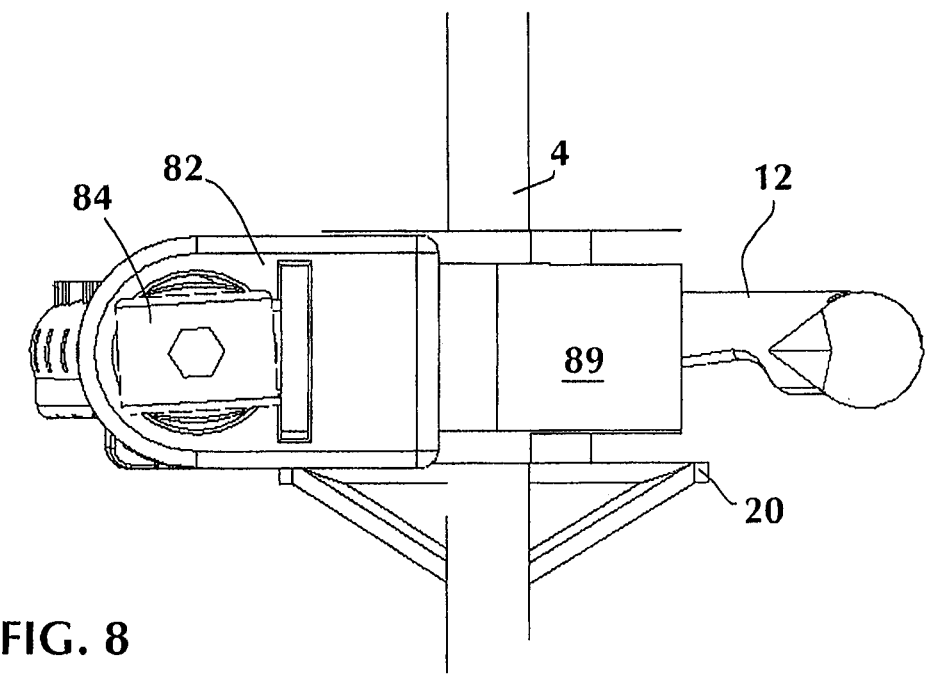
FIG. 8 is a front elevational view of the fishing accessory shown in FIG. 1.
Figure 9:
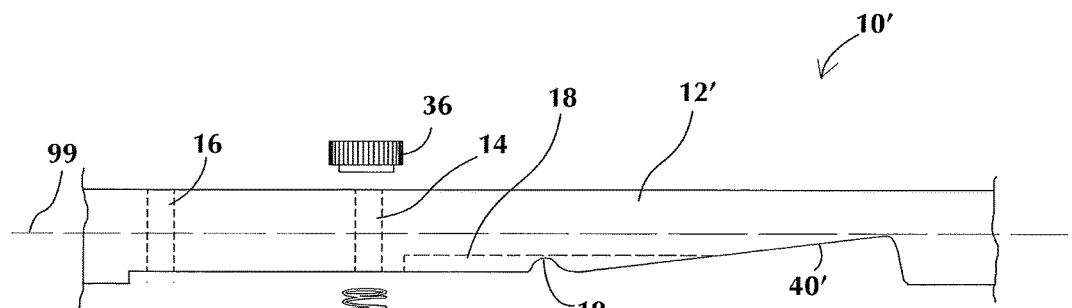
FIG. 9 is an exploded front elevational view of a fishing line holding system according to the present invention.
Figure 10:
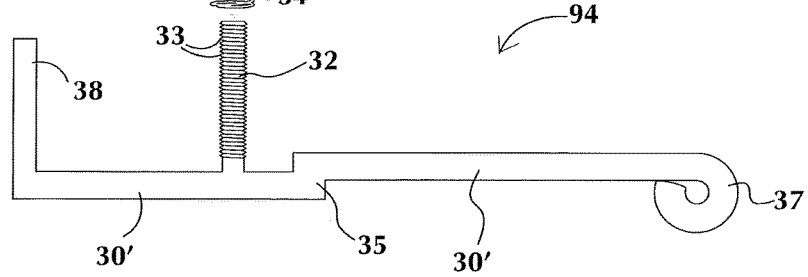
FIG. 10 is a front elevational view of the fishing line holding system shown in FIG. 9, holding a large diameter fishing line.
Figure 11:
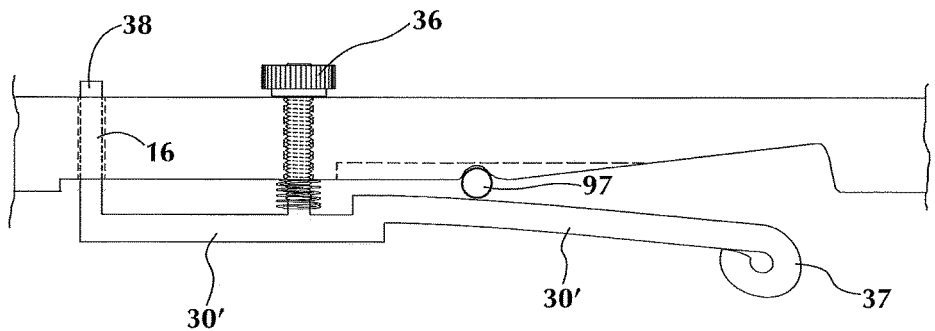
FIG. 11 is a front elevational view of a fishing line holding system shown in FIG. 9, holding a small diameter fishing line.

FIG. 1 shows the fishing accessory 10 attached to a fishing pole having a rod 4, reel 8, a handle 6 and a plurality of fishing pole casting guides 20-25. The fishing accessory 10 is attached to the lower casting guide 20. FIGS. 2-8 show one embodiment of the fishing accessory for preventing the tangling of a fishing line on a fishing pole. The fishing accessory 10 includes a wireform or guide member 30 and guide surface 40 for putting tension on the fishing line to prevent tangling. A plurality of hook holders 50, a line threader 60 and a line cutter 70 are disposed on a portion of the accessory base 12. A fastening system 80 is disposed at one end of the accessory base 12 for attaching the fishing accessory 10 to the pole 4 or may be attached to a portion of the lower casting guide 20. The fishing accessory may be removably attachable to the fishing pole or may be integrated into the fishing pole. The arcuate portion of the fishing accessory is attached to the side of the rod away from the user but may also be used in any orientation on the fishing pole.

Figure 12A:
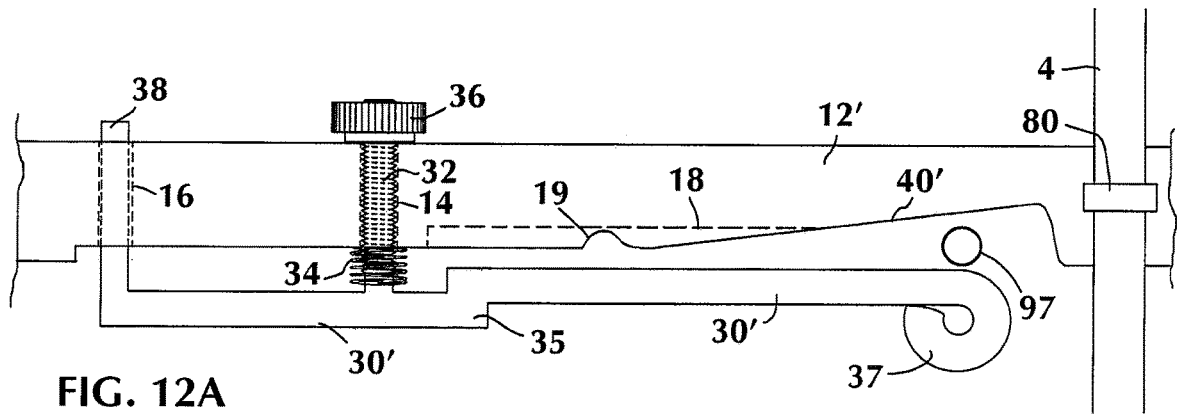
FIGS. 12A, 12B, 13 and 14 show the steps in using the fishing line holding system shown in FIG. 9.
Figure 12B:
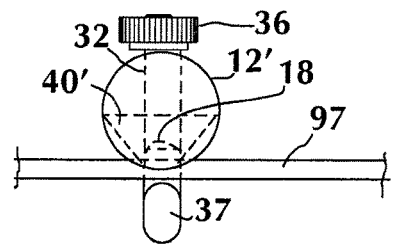
Figure 13:
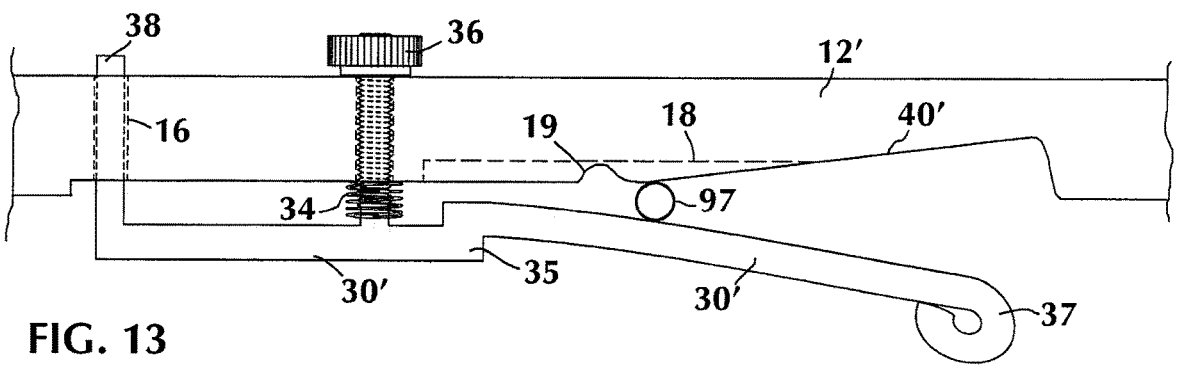
Figure 14:
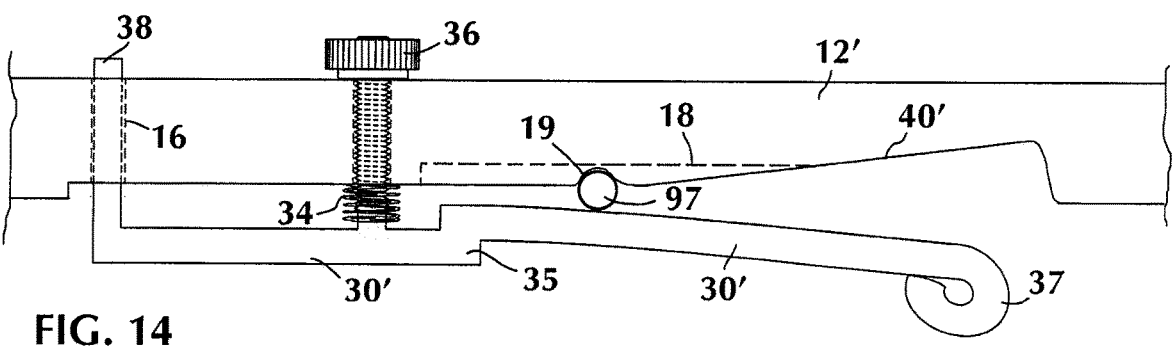

FIGS. 9-14 show one embodiment of the fishing accessory 10' having a base 12', a wireform 94 including a guide member 30' and guide surface 40'. The embodiment shown in FIGS. 9-14 have a relatively straight base 12', guide member 30' and surface 40' in contrast to the arcuate base 12 and arcuate guide member 30 shown in the remainder of the drawings. The fishing accessory 10' comprises a base 12' attachable to the fishing pole rod 4 and an adjustable guide member 30' movable from a first position shown in FIG. 11 wherein a portion of the guide member 30' contacts or is close to the guide surface 40' of the base 12' to a position wherein the portion of the guide member 30' is positioned distant from the guide surface 40'. An adjustment member 32 extends from the guide member 30' and is slidingly engagable with an adjustment opening 14 on the base 12'. A cylindrical nut 36 having internal threads engages threads 33 on the adjustment member 32. A compression spring is disposed around the end of the adjustment member 32 where the adjustment member 32 attaches to the guide member 30'. The cylindrical nut 36 engages the external threads 33 on the opposite end of the adjustment opening 14 as the compression spring 34. Moving the adjustment member 32 in one direction by rotating the cylindrical nut 36 moves the guide member 30' away from the guide surface 40' and moving the adjustment member 32 in the opposite direction moves the guide member 30' closer to the guide surface 40'. The position of the guide member 30' is therefore adjustable toward and away from the guide surface 40' to accommodate specific diameters of fishing line 97, 98. As shown in FIGS. 12-14, the fishing line 97 is placed between a first end of the guide member 30' and the guide surface 40' and slid toward an offset 35 disposed at a central portion of the guide member 30' until the fishing line 97 is secured between the guide member 30' and the guide surface 40' to restrict longitudinal movement of the fishing line. The fishing accessory shown in FIGS. 9-11 may be attachable to the fishing pole or may be integrated into the fishing pole.

The wireform 94 includes a guide member 30', the guide member 30' with or without an offset 35. The wireform 94 may have spring-like properties in order to flex when the fishing line is inserted or extracted from the fishing accessory. The guide member 30' includes ends and is disposable within a groove 18 in the fishing accessory base 12'. The base 12' includes a guide opening 16 and an adjustment opening 14 extending in parallel with the guide opening 16. A guide post 38 extends perpendicular from one end of the guide member 30' and is slidingly disposed in the guide opening 16. An adjustment post or adjustment member 32 extends parallel to the guide post 38, the adjustment member 32 disposed proximate to the offset 35 and slidingly disposed in the adjustment opening 14. The adjustment member 32 includes external threads 33. An adjustment nut 36 may have a ridged perimeter and the internal threads are engagable with the external threads of the adjustment member 32. A spring 34 is disposed about the threaded portion 33 of the adjustment member 32, the spring 34 disposed on the same side of the base 12' that the wireform 94 is inserted into the base 12'. A loop 37 extends from the guide member 30' end opposite the end of the guide member 30' having the guide member 38. The base 12' includes a guide surface 40' which may be inclined and is alignable with a portion of the guide member 30', the inclined guide surface 40' extending in the direction of the guide member 30' length. The base 12' includes a transverse depression 19 disposed across the groove 18 near the shallow portion of the inclined surface 40'. A fishing line 97, 98 may be placed between the guide member 30' and the guide surface 40' adjacent the guide member loop 37 and slid toward an offset 35 or central portion of the guide member 30' until the fishing line 97, 98 is secured in the depression 19 to restrict longitudinal movement of the fishing line 97, 98.

FIGS. 12-14 show a method of using the fishing accessory 10'. The method for using the fishing accessory includes ensuring the fishing accessory is attached to the fishing rod 4 using a fastener 80 and positioning the adjustment member 32 for a specific diameter fishing line. The fishing line is then placed adjacent the end of the guide member 30' having the loop 37 and the fishing line 97 is slid along the guide member 30' until the fishing line 97 is secured between the guide surface 40' and the guide member 30'. The base 12' may include a depression 19 disposed transverse to the groove 18 near the shallow portion of the inclined surface 40' wherein the fishing line is slid along the guide member until the fishing line is secured in the base depression 19 by the guide member 30'.

Figure 15:
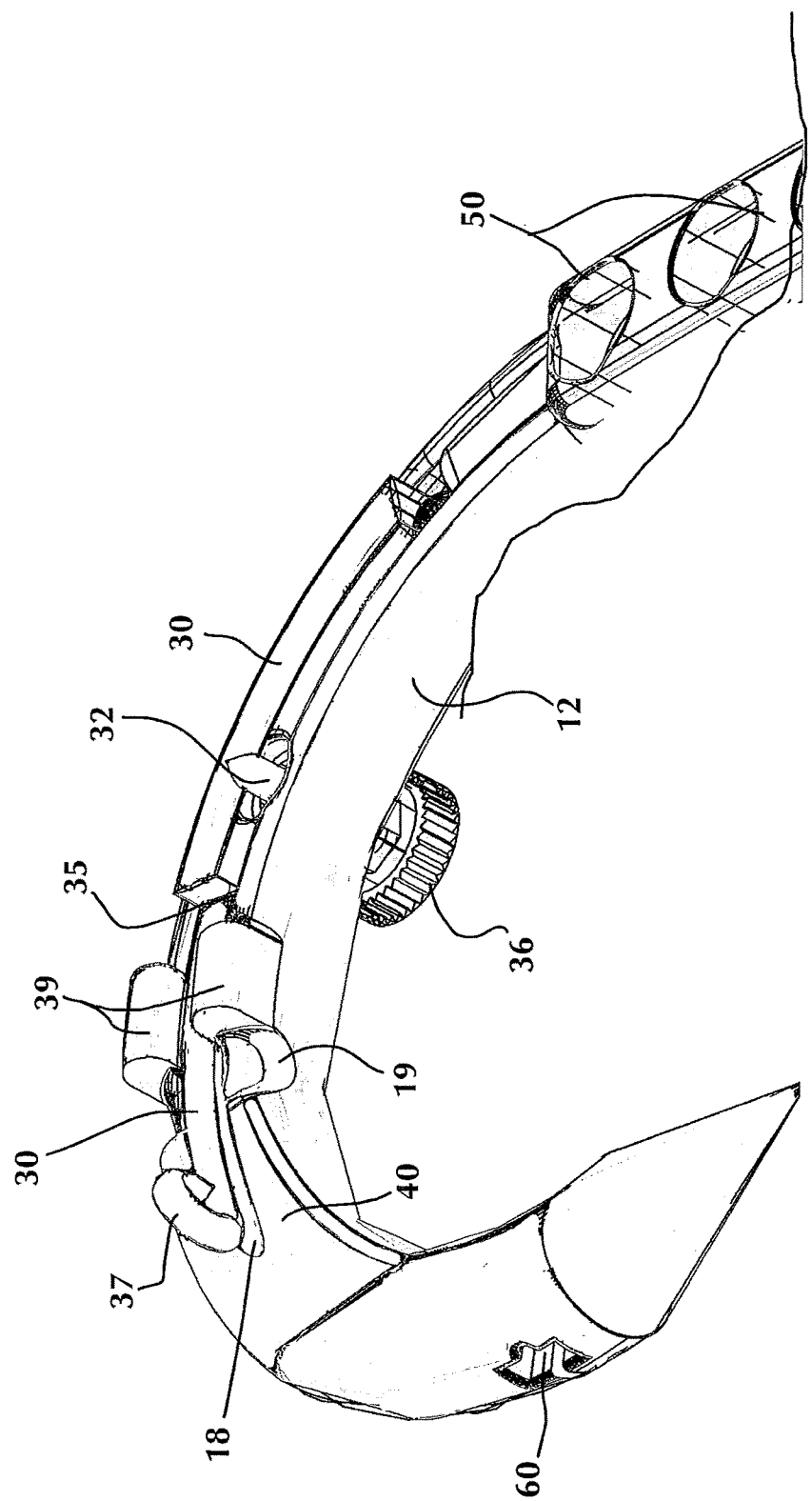
FIG. 15 shows a perspective view of an arcuate embodiment of the fishing line holding system according to the present invention.
Figure 16:
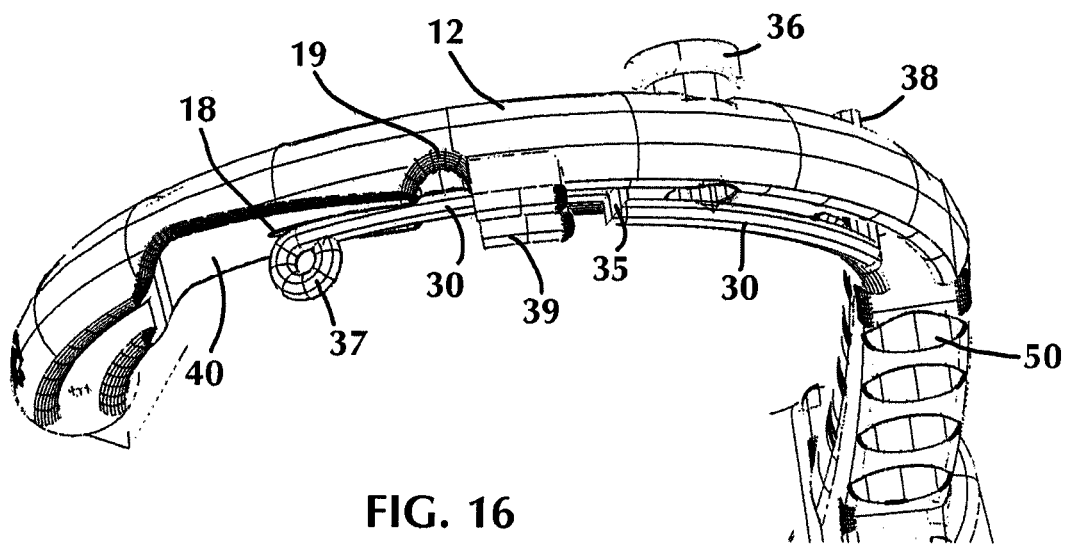
FIG. 16 shows a perspective view of the arcuate embodiment of the fishing line holding system shown in FIG. 15.
Figure 17:
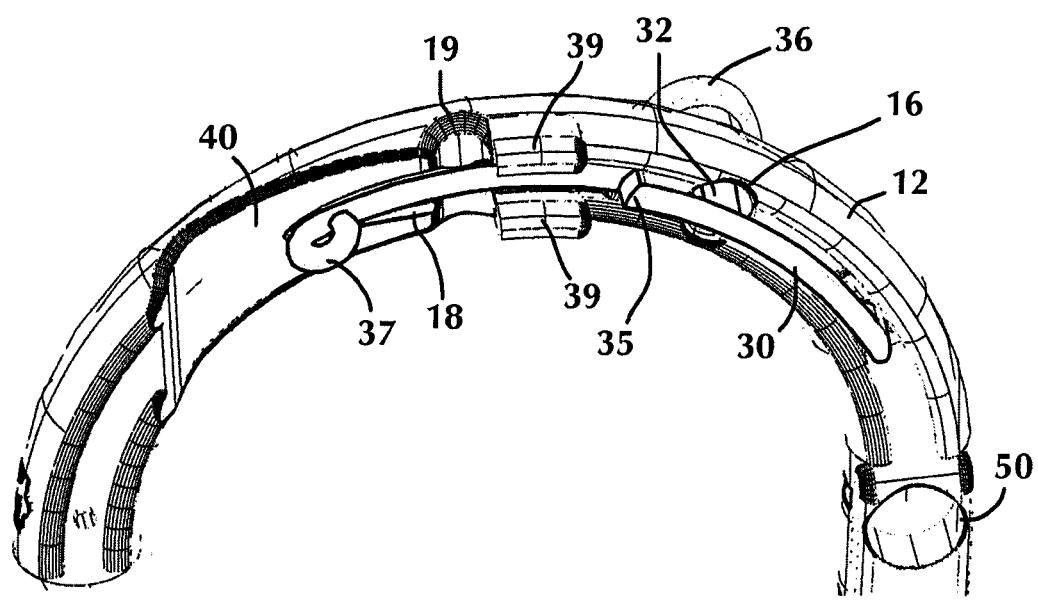
FIG. 17 shows a perspective view of the arcuate embodiment of the fishing line holding system shown in FIG. 15.

FIGS. 15-17 show perspective views of an arcuate embodiment of the fishing accessory. A guide member 30 includes an offset 35 disposed between the adjustment member 32 and the loop 37. The portion of the guide member 30 disposed between the offset 35 and loop 37 engages a groove 18 in the guide surface 40 of accessory base 12. A depression 19 is disposed transverse to the length of the groove 18 and a pair of line stops 39 are disposed adjacent the depression. The stops 39 prevent the fishing line from moving past the depression 19 as the fishing line is slid from a position between the loop 37 and the guide surface 40 inward toward the depression 19 until the fishing line is secured between the guide member 30 and the depression. The adjustment fastener or cylindrical nut 36 is rotated to move the guide member 30 toward or away from the guide surface 40, providing an adjustment so the guide member 30 flexes as the fishing line is slid toward the depression 19, the flexibility of the guide member 30 providing the pressure securing the fishing line into depression 19. The cylindrical nut 36 also provides adjustment to vary the tension which is placed on the fishing line and to accommodate various diameter fishing lines.

Figure 18:
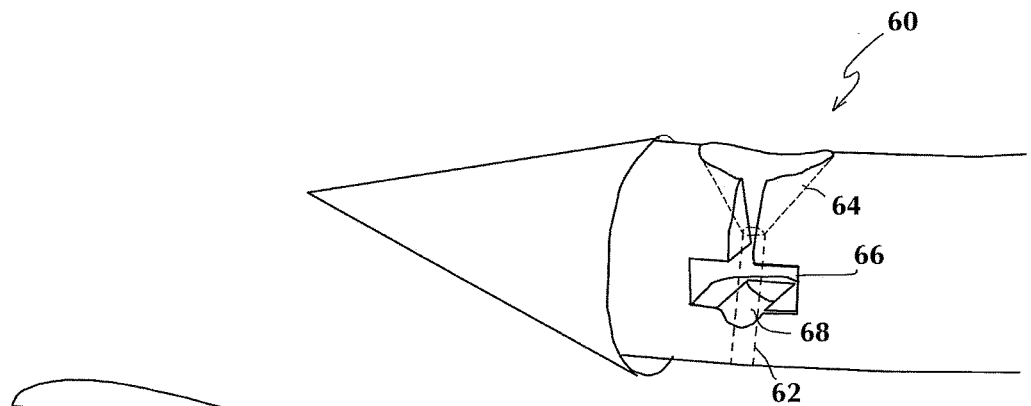
FIG. 18 is a left side perspective view of the fishing line threading cone according to the present invention.
Figure 19A:
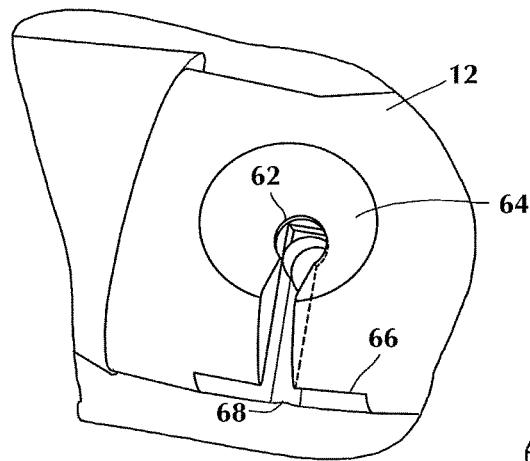
FIG. 19A is a top perspective view of the fishing line threading cone shown in FIG. 18.
Figure 19B:
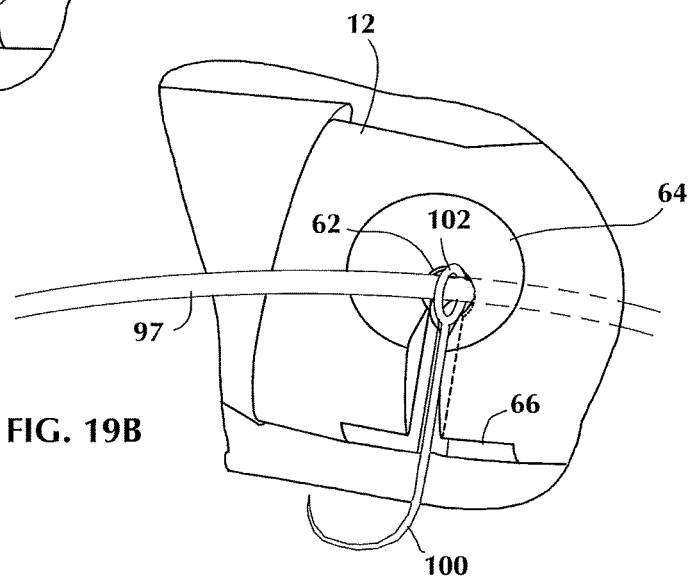
FIG. 19B is a top perspective view of the fishing line threading cone showing the line and hook engaged in the threading cone.

As shown in FIGS. 18 and 19, the fishing accessory may include a fishing line threader 60 to aid in the securing of a hook 100 to a fishing line 97, such as the threading of a fishing line 97 through a fish hook eyelet 102. The threader 60 includes an accessory base 12 having a line threader opening 62 extending fully through the base 12. An upper portion of the opening 62 includes a funnel 64 for guiding the fishing line 97 into the remainder of the opening 62. A rectangular slot 66 is disposed partially through the base 12 perpendicular to and intersecting the opening 62. A slot channel 68 extends along the bottom of the slot 66. In operation as shown in FIG. 19, the hook eyelet 102 is positioned into the slot 66 until the eyelet 102 is axially aligned with the opening 62. An end of the fishing line 97 is guided into the funnel 64 and through the eyelet 102 and the remainder of the opening 62. As the hook 100 is removed from the slot 66, the slot groove 68 allows the portion of the fishing line 97 extending from the bottom of the opening 62 to slide out of the slot 66 without binding at the bottom of the slot 66. A knot may then be made in the fishing line to secure the fishing line 97 to the hook 100.

Figure 20:
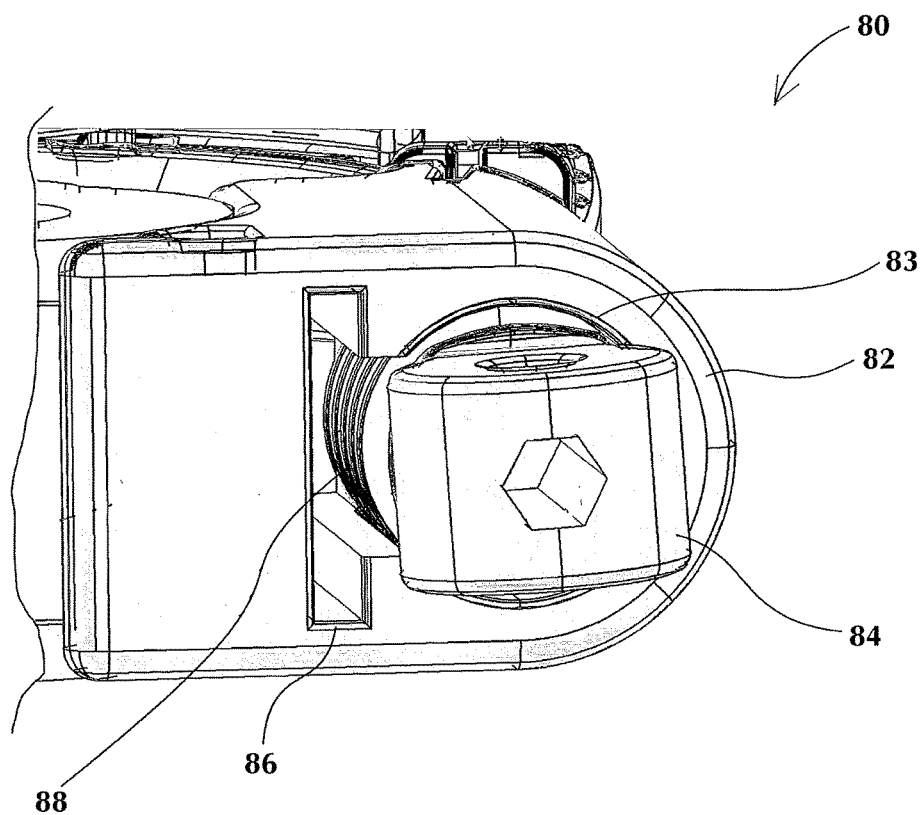
FIG. 20 is a rear perspective view of the fishing accessory fastening system according to the present invention.
Figure 21:
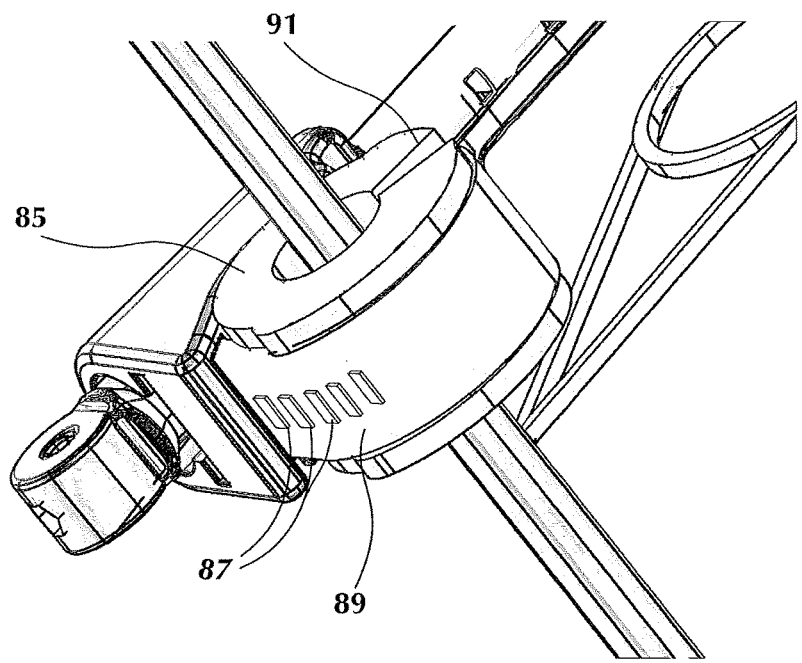
FIG. 21 is a left top perspective view of the fishing accessory fastening system shown in FIG. 20.

FIGS. 20 and 21 show the fastening system 80 for attaching the fishing accessory to a fishing pole or a fishing pole rod. The system includes a fastening base 82 and a circular opening 83 for rotatingly securing a threaded shaft 88 having a knob 84 at one end. The fastening system 80 includes a band 89 having a plurality of parallel teeth 87 for engaging the threaded shaft 88. The band 89 is disposed around the perimeter of a pliable grommet 85 which includes a split 91 for allowing attachment to the fishing rod 4. The band 89 passes through a base slot 86 where a portion of the band 89 having the parallel teeth 87 engage the threaded shaft 88. As the knob 84 is rotated in one direction, the threaded shaft rotates, tightening the band 89 about the grommet 85. As the knob 84 is rotated in the opposite direction, the threaded shaft rotates in the opposite direction, loosening the band 89 about the grommet 85. The teeth 87 may alternately be slots in the band 89 which engage the threaded shaft 88. When the user is finished using the fishing pole and the hook still remains at the end of the fishing line, an opening extending through knob 84 may be used to secure the hook in order to maintain tension on the fishing line when the reel is in the locked position. The hook tip is placed through the opening of the knob 84 and the hook is rotated so the arcuate portion of the hook is engaged with the knob opening.

Figure 22:
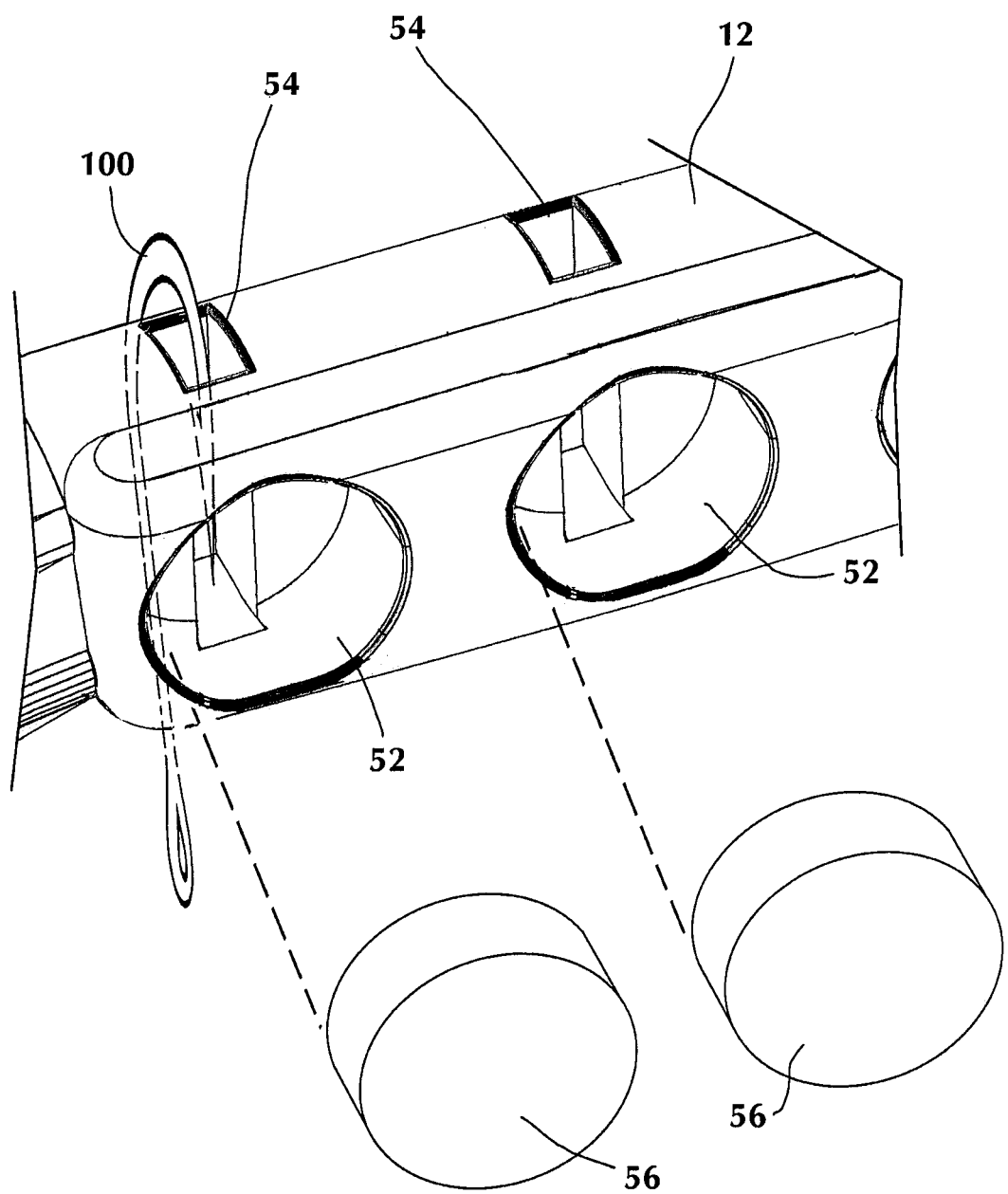
FIG. 22 is a perspective view of the fishing hook holding system according to the present invention.

FIG. 22 shows a close up perspective view of a portion of the fishing accessory which includes fishing hook holders 50 for storing extra fish hooks 100. The hook holders 50 include storage openings 54 for placing the hook 100 tip into. Magnets 56 are disposed in magnet openings 52. The magnet openings 52 extend partially through the accessory base 12 and intersect the corresponding storage opening 54 to allow the magnets 56 to directly contact the portion of the hook 100 within the storage opening. The magnets 56 apply an attraction force to the fishing hook 100 once the hook 100 is placed in the storage openings 54. In operation, the hook 100 is placed in the storage opening 54 where the magnet 56 holds the hook 100 in place. To remove the hook 100, the hook 100 is urged out of the storage opening 54 by applying sufficient force to break the magnetic bond between the hook 100 and the magnet 56.

Figure 23:
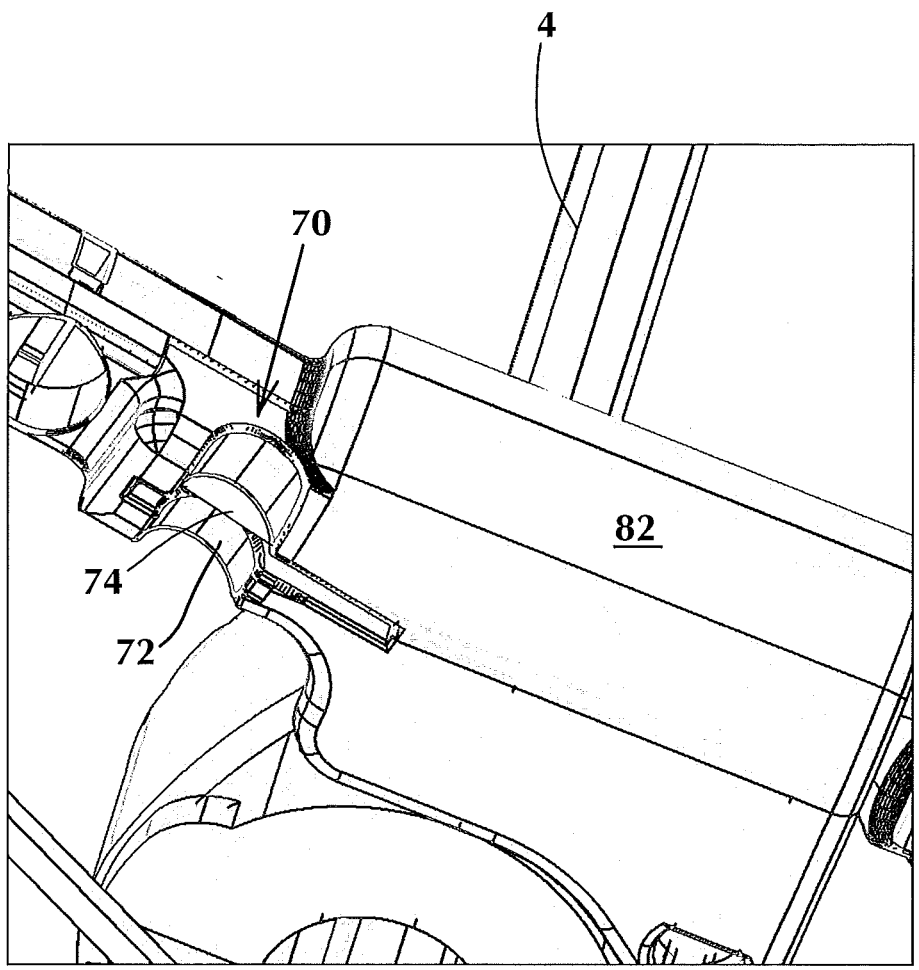
FIG. 23 is a perspective view of the fishing line cutting system according to the present invention.

As shown in FIG. 23, the fishing accessory may include a fishing line cutter 70 having a razor blade 74 permanently fixed along a notch 72 along the length of the fishing accessory, preferably at the bottom, away from the tensioning device in order to avoid accidental cuts. The razor blade 74 may be used to cut off excess or compromised fishing line.

FIG. 24 is a perspective view of the lower half of a fishing pole 200 having a fishing accessory 300 integrated with the fishing pole 200 or integrated into one of the casting guides 20'. FIG. 25 shows a close-up of a tensioning casting guide 300 comprising a line guide member 330 movable toward and away from a guide surface 390 on the casting guide ring 310. The casting guide 300 may be permanently attached to the fishing pole or the casting guide may be attachable to the fishing pole. In operation, the fishing line 400 which extends from the reel 8, through all of the casting guides 20', 21', etc. to the upper tip of the rod, may have tension applied by the fishing accessory 300 as the fishing line 400' extends from the tip of the rod to the line guide 330 or depression 319 and from the line guide the fishing line 400" extends outward for access by the user. An adjustment fastener 350 and adjustment post 340 may be used to change the position of the guide member 330 with respect to the guide surface 390 for holding various fishing line diameters. Since the fishing line 400 from the reel 8 to the tip of the rod extends within the rings of the casting member 20', 21', etc. and the fishing line 400' extends outside the rings, the tension on both fishing lines 400', 400" prevents them from contacting one another and therefore preventing the tangling of the fishing line 400', 400". In operation the user pulls out as much fishing line required for repair, locks the reel 8, pulls the fishing line 400' under the guide loop 370 and between the guide member 330 and guide surface 390 until the fishing line 400' is secured between the guide member 330 and guide surface 390, the fishing line 400' preferably engaged in a transverse depression 319 so that the guide member 330 compresses the fishing line in the transverse depression 319. The adjustment fastener 350 may be adjusted to vary the pressure placed on the fishing line 400' engaged in the transverse depression 319.

Figure 26:
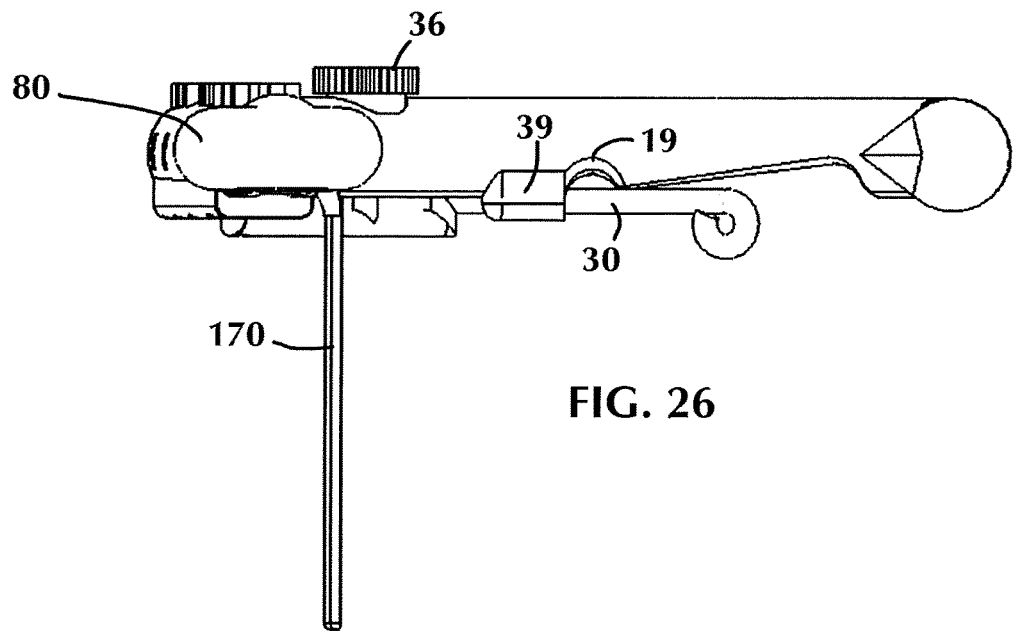
FIG. 26 is a front elevational view of the fishing accessory including the securing post for attaching to a fishing rod.
Figure 27:
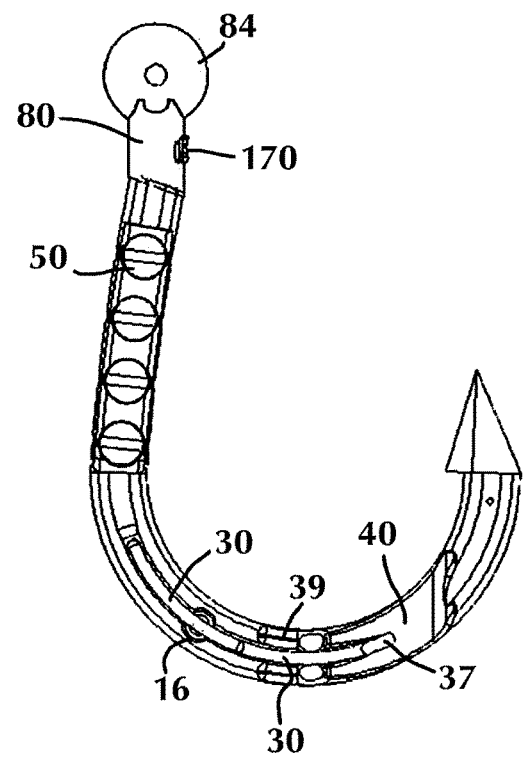
FIG. 27 is a bottom elevational view of the fishing accessory shown in FIG. 26.

FIGS. 26 and 27 show the fishing accessory having a securing post 170 extending downward from the fastening system 80. The securing post 170 may be used for additional support in securing the fishing accessory to the fishing pole rod. The securing post 170 secures the fishing accessory to the fishing pole rod by placing the securing post against the fishing rod and lacing or wrapping a material around the securing post and the fishing rod. The securing post 170 is preferably metal, but any material which can support the fishing accessory may be used. The wrapping material may be fiberglass, composite, plastic, nylon or any waterproof textile. An adhesive, epoxy, lacquer or the like may be applied to the lacing or wrapping material to permanently secure the fishing accessory to the fishing pole rod by the securing post 170. The securing of the fishing accessory to the fishing pole rod by the securing post may be accomplished during manufacturing or assembly of the fishing rod. The fishing accessory may alternately be secured by the end user. The fishing rod may also be altered to engage the securing post 170 for assembly, such as milling a slot or opening in the fishing pole rod to engage the securing post.

The device may include a bottle opener located on the fishing accessory in order to remove caps from bottles.

The device may include a miniature flashlight that shines outward where the arc of the solid body begins, in order to illuminate areas of interest in the dark. A rechargeable battery may exist within the solid body connected to the light and to a charging port that may exist on the outside of the solid body in order to allow for recharging.

The invention as described above meets the objectives set forth in the summary. The present invention provides a fishing accessory that prevents tangling of a fishing line as well as provides a fishing accessory which can secure a fishing line of various diameters. The present invention provides a fishing accessory which magnetically secures fishing hooks to the accessory. The fishing accessory is attachable to a fishing pole with a band clamp system. The present invention also provides a fishing accessory which allows easy threading of a fishing line through the fishing hook eyelet and a fishing accessory integrated with the fishing pole or integrated directly into a casting guide.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, Thus, having described the invention, what is claimed is:

1. A fishing accessory for preventing a tangling of a fishing line on a fishing pole comprising:
   a base attachable to the fishing pole and extendable therefrom;
   an adjustable guide member movable from a first position wherein a portion of the guide member contacts a guide surface of the base to a second position wherein the portion of the guide member is positioned distant from the guide surface;
   an adjustment member extending from the guide member or the base, the adjustment member engaged with the base wherein moving the adjustment member in one direction moves the guide member away from the guide surface and moving the adjustment member in an opposite direction moves the guide member closer to the guide surface, wherein the base has a primary axis and an outer surface and the guide surface extends along a portion of the base in a general direction of the primary axis;
   a channel perpendicular to the primary axis and adjacent the guide surface where the guide surface intersects the outer surface of the base, the fishing line securable in the channel when the fishing line is slid along the guide member until the fishing line contacts the channel; and
   wherein the guide member is adjustable toward and away from the guide surface to accommodate a specific diameter fishing line;
   wherein the fishing line may be placed between a first end of the guide member and the guide surface and slid toward a central portion of the guide member until the fishing line is secured between the guide member and the guide surface to restrict longitudinal movement of the fishing line;
   and the adjustable guide member is an elongated rod having a length, a guide member second end opposite the first end wherein the fishing line is placed between the guide member first end and slid along the guide member until the fishing line is secured between the guide member and the guide surface to restrict longitudinal movement of the fishing line; and
   wherein the guide surface is an inclined surface extending gradually in the direction of the primary axis and extending sharply inward from the base outer surface toward the primary axis and a first portion of the guide member contacts the inclined surface at a location where the inclined surface intersects the primary axis in the first position and wherein the first portion of the guide member is positioned distant from the inclined surface in the second position.

2. A fishing accessory for preventing a tangling of a fishing line on a fishing pole comprising:
   a base attachable to the fishing pole and extendable therefrom;
   an adjustable guide member movable from a first position wherein a portion of the guide member contacts a guide surface of the base to a second position wherein the portion of the guide member is positioned distant from the guide surface;
   an adjustment member extending from the guide member or the base, the adjustment member engaged with the base wherein moving the adjustment member in one direction moves the guide member away from the guide surface and moving the adjustment member in an opposite direction moves the guide member closer to the guide surface;
   wherein the guide member is adjustable toward and away from the guide surface to accommodate a specific diameter fishing line; and
   a compression spring disposed around the adjustment member and adjacent a cylindrical opening second end, the compressing spring urging the guide member away from the guide surface;
   wherein the fishing line may be placed between a first end of the guide member and the guide surface and slid toward a central portion of the guide member until the fishing line is secured between the guide member and the guide surface to restrict longitudinal movement of the fishing line; and
   wherein the adjustment member is a threaded cylindrical rod slidingly disposed in a cylindrical opening extending through the base, the cylindrical opening having a first end and second end, the fishing accessory including a threaded nut engagable with a distal end of the threaded adjustment member, the distal end protruding from the first end of the cylindrical opening, wherein turning the nut in one direction moves the guide member closer to the guide surface and turning the nut in an opposite direction moves the guide member away from the guide surface.

3. A fishing accessory for preventing a tangling of a fishing line on a fishing pole comprising:
   a base attachable to the fishing pole and extendable therefrom;
   an adjustable guide member movable from a first position wherein a portion of the guide member contacts a guide surface of the base to a second position wherein the portion of the guide member is positioned distant from the guide surface;
   an adjustment member extending from the guide member or the base, the adjustment member engaged with the base wherein moving the adjustment member in one direction moves the guide member away from the guide surface and moving the adjustment member in an opposite direction moves the guide member closer to the guide surface; and
   a hook threader for a fishing accessory comprising:
      a circular opening extending through the base, the circular opening having a central axis;
      a rectangular slot extending perpendicular to the circular opening, the rectangular slot having a height extending in a direction of the circular opening central axis, a width extending along a length of the fishing accessory and a depth extending from an outer surface of the fishing accessory toward the circular opening;
      a funneled opening juxtaposed with the circular opening, the funnel opening wider at the fishing accessory outer surface and tapering down to a diameter of the circular opening adjacent the rectangular slot; and
      a channel disposed in a surface of the rectangular slot opposite a second surface of the rectangular slot adjacent the funneled opening, the channel extending from the fishing accessory outer surface to the circular opening;
      wherein a fishing hook eyelet disposed on a fishing hook is insertable into the rectangular slot and a fishing line is insertable into the funneled opening, the fishing line passing through the eyelet of the hook;

wherein the guide member is adjustable toward and away from the guide surface to accommodate a specific diameter fishing line; and wherein the fishing line may be placed between a first end of the guide member and the guide surface and slid toward a central portion of the guide member until the fishing line is secured between the guide member and the guide surface to restrict longitudinal movement of the fishing line.

* * * * *